United States Patent
Kono (10) Patent No.: US 6,917,599 B2
(45) Date of Patent: Jul. 12, 2005

(54) TRANSMISSION POWER CONTROL SYSTEM IN MOBILE COMMUNICATION SYSTEM

(75) Inventor: Masaki Kono, Saitama (JP)

(73) Assignee: NEC Corporation, Tokyo (JP)

( * ) Notice: Subject to any disclaimer, the term of this patent is extended or adjusted under 35 U.S.C. 154(b) by 952 days.

(21) Appl. No.: 09/739,827

(22) Filed: Dec. 20, 2000

(65) Prior Publication Data

US 2001/0004374 A1 Jun. 21, 2001

(30) Foreign Application Priority Data

Dec. 21, 1999 (JP) .......................................... 11-362851

(51) Int. Cl.⁷ .............................................. H04B 7/216
(52) U.S. Cl. ..................................... 370/320; 370/318
(58) Field of Search ................................ 370/392, 318, 370/320, 335, 342, 468; 375/244, 312, 329, 308, 330; 455/68–70, 522, 127, 13.4

(56) References Cited

U.S. PATENT DOCUMENTS

| | | | | |
|---|---|---|---|---|
| 6,137,788 A | * | 10/2000 | Sawahashi et al. | ......... 370/342 |
| 6,311,070 B1 | * | 10/2001 | Tong et al. | ................. 455/522 |
| 6,389,296 B1 | | 5/2002 | Shiraki et al. | |
| 6,529,741 B1 | * | 3/2003 | Tong et al. | ................. 455/522 |
| 6,590,874 B1 | * | 7/2003 | Wang et al. | ................ 370/318 |
| 2002/0115461 A1 | | 8/2002 | Shiraki et al. | |
| 2002/0187799 A1 | * | 12/2002 | Haartsen | ..................... 455/509 |

FOREIGN PATENT DOCUMENTS

| | | |
|---|---|---|
| CN | 1217840 | 5/1999 |
| JP | 8-275233 | 10/1996 |
| JP | 11-112420 | 4/1999 |
| JP | 11-154905 | 6/1999 |
| JP | 11-298407 | 10/1999 |
| JP | 2000-513557 | 10/2000 |
| WO | WO 98/36508 A1 | 8/1998 |
| WO | WO 99/49596 A1 | 9/1999 |

* cited by examiner

*Primary Examiner*—Wellington Chin
*Assistant Examiner*—Mark A Mais
(74) *Attorney, Agent, or Firm*—Foley & Lardner LLP (57) ABSTRACT

In a CDMA type mobile communication system, when both a radio channel in an up-link direction and a radio channel in a down-link direction are interrupted, a base station successively increases down-link transmission power by 1 dB in a constant interval until a response is sent from a mobile station, while releasing the normal down-link transmission power control operation. Also, the base station controls a power control bit produced by the base station so as to successively increase up-link transmission power of the mobile station.

10 Claims, 9 Drawing Sheets

TRANSMISSION POWER CONTROL SYSTEM IN MOBILE COMMUNICATION SYSTEM

BACKGROUND OF THE INVENTION

The present invention generally relates to a transmission power control system used in a mobile communication system operable by a code division multiplex access system (simply referred to as a "CDMA" system hereinafter). More specifically, the present invention is directed to a transmission power control system capable of avoiding an occurrence of a so-called "call drop" phenomenon.

Since very recent electronic communication techniques are greatly progressed, mobile communication systems such as automobile telephone and portable telephone are rapidly popularized. In connection with this progress in the electronic communication techniques, the mobile communication systems are gradually transfixed from the time division multiple access (TDMA) system to the code division multiple access (CDMA) system.

Generally speaking, a CDMA type cellular mobile communication system owns the below-mentioned advantages.

(1) This cellular mobile communication system owns a high durability with respect to interference such as radio interference and radio disturbances.

(2) Since power spectrum density is low, interference given to other communication channels becomes small.

(3) Since power spectrum density is low, superior secrecies can be established.

(4) The superior secrecies can be established by employing spread codes.

(5) The multiple access can be carried out by using different spread codes.

(6) The mobile communications can be carried out under over load conditions.

However, while the CDMA type cellular mobile communication system can have the above-explained various merits, this cellular mobile communication system should own various problems. Among these problems, there is an interference problem. As a typical interference problem, a so-called "near-to-far" problem may occur. This "near-to-far" problem implies such a phenomenon that while a communication is established between a base station and a desirable mobile station located far from this base station, another interference mobile station located in the vicinity of this base station may give large interference to the desirable mobile station under communication. This "near-to-far" problem may occur not only in the CDMA type mobile communication systems, but also other conventional mobile communication systems. That is, this "near-to-far" problem is known as channel-to-channel interference (same channel interference/adjoining channel interference). In particular, since a large number of mobile stations commonly use the same frequency in the CDMA system, this interference problem may become serious problems.

To solve such an interference problem, various sorts of transmission power control units are provided in order to reduce the interference amounts in the CDMA type mobile communication systems. As these transmission power control units, there are two types of transmission power control units, namely a reverse-link (up-link direction) transmission power control unit operable for the mobile station to the base station, a forward-link (down-link direction) transmission power control unit operable for the base station to the mobile station.

Reception electric field strength measurement is carried out by a reception unit of the base station in the up-link transmission power control unit, and the base station measures the electric field strength of a radio signal transmitted from the mobile station. As a result of this field strength measurement, when the received electric field strength is higher than a predetermined threshold value, the base station instructs the mobile station to reduce the transmission power by using the power control bit. On the other hand, when the received electric field strength is lower than the predetermined threshold value, the base station instructs the mobile station to increase the transmission power by using the power control bit.

On the other hand, the received electric field strength measurement is carried out by the reception unit of the mobile station in the down-link direction transmission power control unit. The mobile station measures the received electric field strength of the information signal which is broadcasted from the base station. The mobile station produces the transmission power control information based upon the measured reception electric field strength, and then sends the produced transmission power control information to the base station. The base station calculates the transmission power from this transmission power control information and adjusts the transmission power.

In such a transmission power control system, for instance, IS-95 standard of TIA/EIA (Telecommunication Industry Association/Electronic Industry Association), a down-link direction transmission control operation is independently performed with respect to an up-link direction transmission control operation.

However, the conventional transmission power control system owns the below-mentioned problem.

Figure 1:
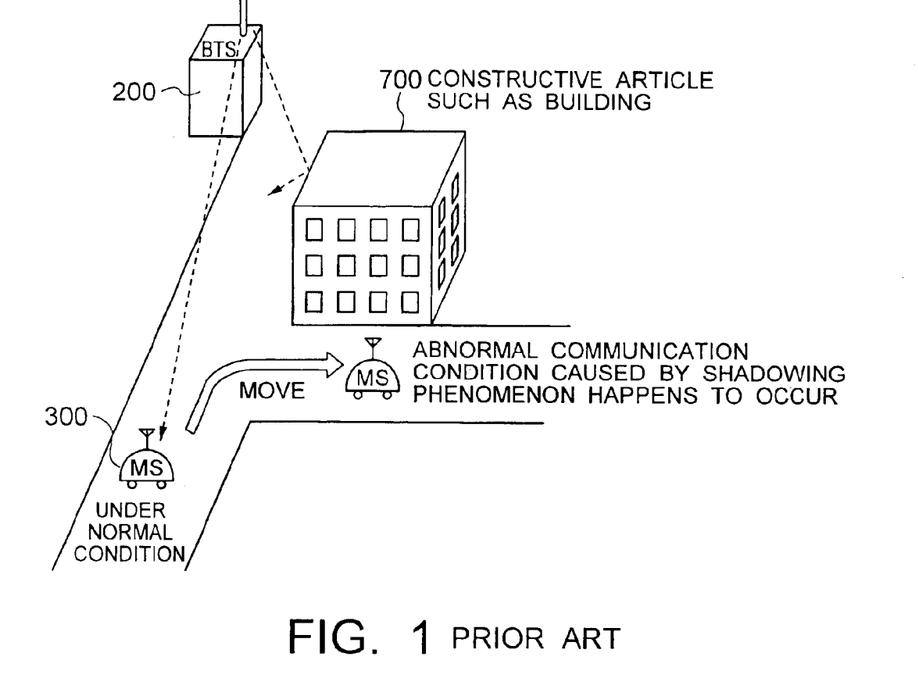
FIG. 1 is an explanatory diagram for explaining the problem of a conventional transmission power control system.

Referring now to FIG. 1, the problem of this conventional transmission power control system is explained as follows. FIG. 1 pictorially represents such a condition that a mobile station 300 which is communicated with a base station 200 under normal condition is moved to a shadow portion of a constructive article 700. The constructive article 700 is located at a position where a radio communication channel established between the base station 200 and the mobile station 300 is cut off. It should be noted that this shadow portion of the constructive article 700 corresponds to an insensitive zone where radio waves transmitted from another base station located adjacent to this base station 200 cannot be reached, namely the base station 200 cannot hand off the communication.

Under such a condition, the mobile station 300 operated under the IS-95 standard of TIA/EIA stops the transmission output in such a case that an effective signal of a down-link radio channel cannot be received for a certain time period. At the same time, the base station 200 also cannot receive an up-link radio signal transmitted from the mobile station 300. This up-link radio signal contains quality condition information of the radio channel which is necessarily required so as to execute the transmission power control operation of the down-link radio channel. As a result, the base station 200 stops the transmission power control operation of the down-link radio channel. As a consequence, this conventional transmission power control system owns such a problem that the call drop phenomenon may occur.

SUMMARY OF THE INVENTION

An object of the present invention is to provide a transmission power control system capable of recovering a communication established between a base station and a mobile station even in such a case that both an up-link direction of a radio channel and a down-link direction of the radio channel are interrupted, which is caused by such a fact that the mobile station communicated with the base station under normal condition is moved to a place where an interruption of radio waves happens to occur due to a constructive article such as a building.

A transmission power control system used in a mobile communication system according to the present invention is applied to a CDMA type mobile communication system arranged by a mobile station, a plurality of base stations, and a base station control apparatus.

The CDMA type mobile communication system, according to an aspect of the present invention, is featured by comprising:

a first section for increasing down-link transmission power of the base station in a constant interval until a response is issued from the mobile station, while the base station transmits a report request of a reception condition to the mobile station to report a reception condition of the mobile station in the case that a radio channel is interrupted by such a reason that the mobile station communicated with the base station under normal condition is moved to a place where radio wave interruption caused by a constructive article happens to occur;

and a second section for increasing up-link transmission power of the mobile station in a constant interval, while controlling a power control bit combined in the report request.

It should be understood that each of the increasing values of both the down-link transmission power of the base station and the up-link transmission power of the mobile station in the constant interval is selected to be 1 dB. Also, since the base station is further comprised of traffic measuring section, the respective increasing values may be set within a range defined between 0.5 dB and 2 dB in response to a traffic amount measured by the traffic measuring section.

Also, the respective increasing values may be set within a range defined between 0.5 dB and 2 dB in response to a use rate of a radio appliance board of the base station.

Furthermore, when the use rate of the radio appliance board of the base station is smaller than, or equal to 25%, the increasing value may be set to 2 dB; when the use rate of the radio appliance board of the base station is larger than, or equal to 75%, the increasing value may be set to 0.5 dB; and when the use rate of the radio appliance board of the base station exceeds 25% and is smaller than 75%, the increasing value nay be set to 1 dB.

DESCRIPTION OF THE PREFERRED EMBODIMENTS

Referring now to drawings, a transmission power control system according to a first embodiment of the present invention will be described in detail.

Figure 2:
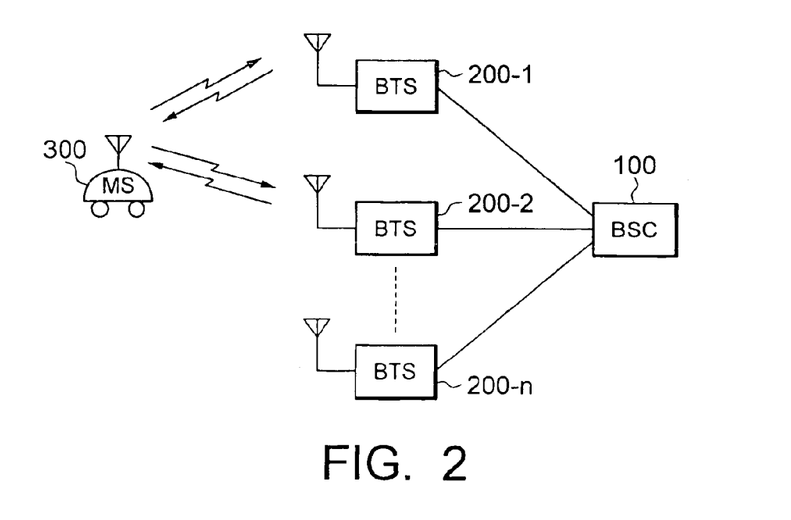
FIG. 2 is a schematic block diagram for indicating an arrangement of a mobile communication system to which the present invention is applied.

FIG. 2 is a block diagram of a mobile communication system to which the first embodiment of the present invention is applied. In FIG. 2, a base station control apparatus 100 is connected to a base station 200-1, a base station 200-2, and a base station 200-n (symbol "n" being a positive integer) by using a wired transfer approach line constituted by exclusively-used lines. The respective base stations 200-1, 200-2, 200-n may be connected to the mobile station 300 by using radio channels. There are two radio channels, namely an up-link radio channel directed from the mobile station 300 to the relevant base station, and a down-link radio channel directed from the relevant base station to the mobile station 300.

Figure 3:
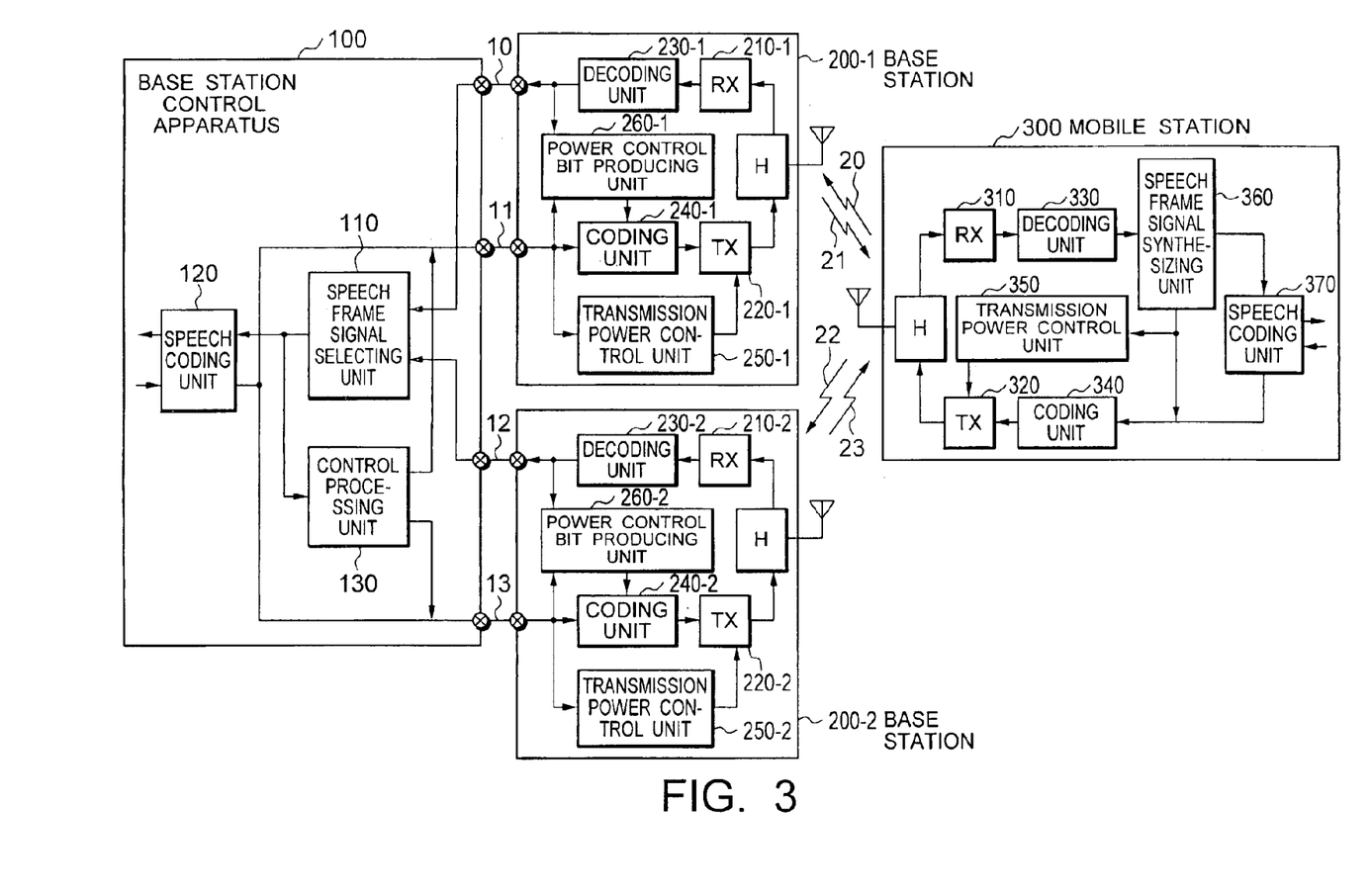
FIG. 3 is a schematic block diagram for representing arrangements of a base station control apparatus, a base station, and a mobile station provided in a mobile communication system according to a first embodiment of the present invention.

FIG. 3 is a schematic block diagram for showing internal arrangements of the above-explained base station control apparatus 100, base station 200-1, base station 200-2, and mobile station 300, which are shown in FIG. 2. In FIG. 3, the apparatuses of the up-link direction of the base station 200-1 contain a reception unit 210-1 and a decoding unit 230-1. The reception unit 210-1 receives an up-link radio signal 20 transmitted (broadcasted) from the mobile station 300 and demodulates the received up-link radio signal. The decoding unit 230-1 decodes the up-link radio signal demodulated by the reception unit 210-1 to obtain an up-link speech frame signal. A reception Eb/No of the signal demodulated by the demodulating unit 230-1 is supplied to a power control bit producing unit 260-1, and the decoded up-link speech frame signal is supplied to the base station control apparatus 100. In this case, "Eb/No" indicates a noise amount per energy/1 Hz with respect to a single bit.

The apparatuses of the down-link direction of the base station 200-1 contain a coding unit 240-1, a transmission unit 220-1, a transmission power control unit 250-1, and a power control bit producing unit 260-1. The coding unit 240-1 codes a down-link speech frame signal transmitted from the base station control apparatus 100. The transmission unit 220-1 modulates the signal coded by the coding unit 240-1 and transmits the modulated signal. The transmission power control unit 250-1 calculates desirable transmission power based upon both electric field strength information and a reference Ec/Io sent from the base station control apparatus 100 so as to change the transmission power in a proper manner. In this case, "Ec/Io" shows a ratio of a signal to interference wave power. The power control bit producing unit 260-1 compares the reception Ec/No sent from the decoding unit 230-1 with the internally produced reference Ec/Io to produce a power control bit. It should be noted that an internal arrangement of the base station 200-2 is the same as that of the base station 200-1.

The base station control apparatus 100 includes a speech frame signal selecting unit 110, a speech coding unit 120, and a control processing unit 130. The speech frame signal selecting unit 110 selects such a speech frame signal having the highest signal quality from the up-link speech for signals sent from the base station, and then compares the quality of the selected speech frame signal with a reference value. The speech coding unit 120 converts speech data contained in an up-link speech frame signal into an up-link speech signal, and converts a down-link speech signal into speech data contained in a down-link speech frame signal. The control processing unit 130 produces the reference Ec/Io based upon transmission power report information. This transmission power report information is sent via the base station from the mobile station which receives the down-link radio signal.

The apparatuses of the down-link direction of the mobile station 300 contains a reception unit 310, a decoding unit 330, a speech frame signal synthesizing unit 360, and a speech coding unit 370. The reception unit 310 receives a down-link radio signal 21 transmitted from the base station 200-1 and demodulates the received down-link radio signal 21. The decoding unit 330 decodes the down-link radio signal 21 demodulated by the reception unit 310 to obtain a down-link speech frame signal. The speech frame signal synthesizing unit 360 executes a signal weighting/synthesizing operation based upon speech data signal good/no-good information contained in the down-link speech frame signal. The speech coding unit 370 converts the speech data contained in the down-link speech frame signal into a down-link speech signal.

The apparatuses of the up-link direction of the mobile station 300 contains a speech coding unit 370, a coding unit 340, a transmission unit 320, and a transmission power control unit 350. The speech coding unit 370 converts an up-link speech signal into speech data contained in an up-link speech frame signal. The coding unit 340 codes the up-link speech frame signal. The transmission unit 320 modulates the up-link speech frame signal coded by the coding unit 340 to transmit the coded up-link speech frame signal. The transmission power control unit 350 changes transmission power based upon a power control bit in a proper manner.

Figure 4:
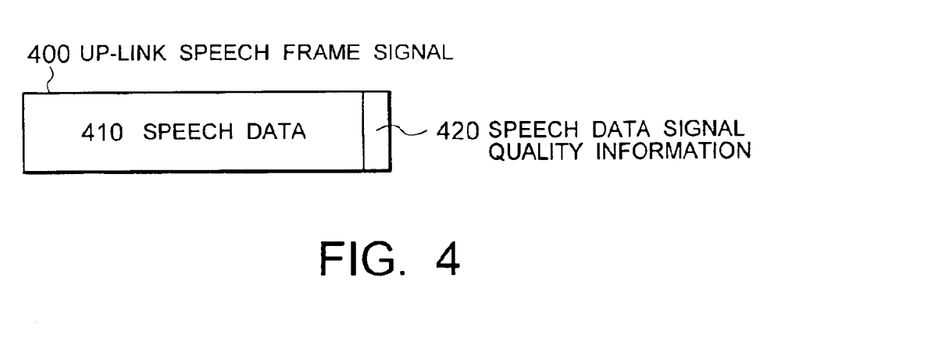
FIG. 4 schematically shows a structure of an up-link frame signal used in the mobile communication system of the present invention.
Figure 5:
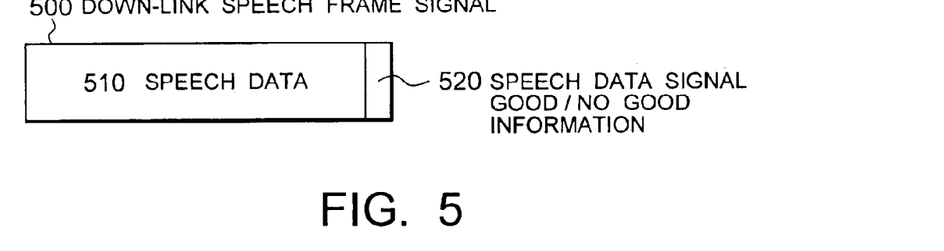
FIG. 5 schematically shows a structure of a down-link frame signal used in the mobile communication system of the present invention.
Figure 6:
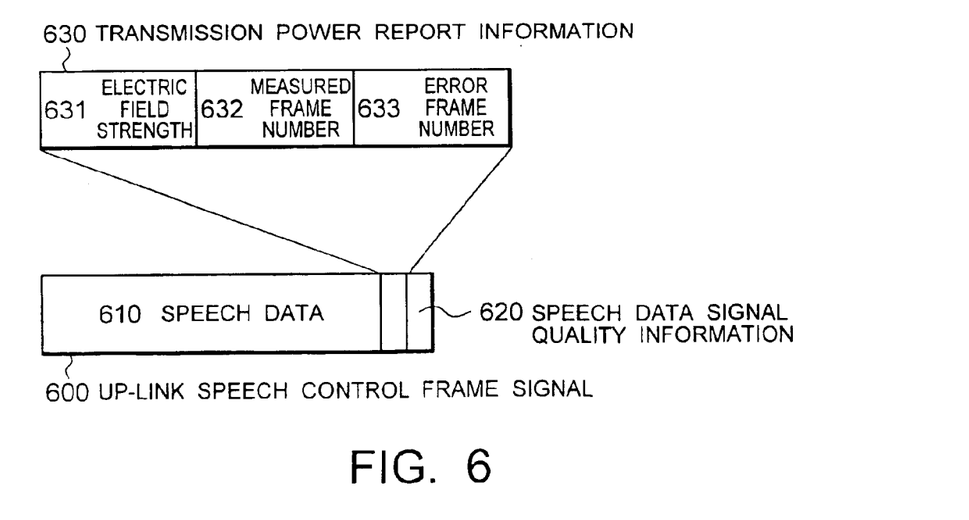
FIG. 6 schematically indicates a structure of an up-link speech control frame signal used in the Mobile communication system of the present invention.

FIG. 4 schematically shows a structure of an up-link frame signal used in the mobile communication system of the first embodiment of the present invention. FIG. 5 schematically shows a structure of a down-link frame signal. FIG. 6 schematically indicates a structure of an up-link speech control frame signal.

Referring now to FIG. 3 to FIG. 5, a description will be made of up-link power control operations under normal operation.

As shown in FIG. 3 to FIG. 5, in the base station 200-1, the up-link radio signal 20 transmitted from the mobile station 300 is received by the reception unit 210-1, and then, is decoded by the decoding unit 300, so that an up-link speech frame signal 400 shown in FIG. 4 is produced. The up-link speech frame signal 400 is constituted by speech data 410 and speech data signal quality information 420. The up-link speech frame signal 400 produced in the base station 200-1 is transmitted via the exclusively-used line 10 to the base station power control apparatus 100, and is further inputted to the speech frame signal selecting unit 110. In the speech frame signal selecting unit 110, the speech data quality information 420 is checked from the up-link speech frame signals 400 sent from a plurality of base stations so as to select such a speech frame signal having the highest signal quality. Also, the speech frame signal selecting unit 110 sends the up-link speech frame signal 400 to the speech coding unit 120 in the case that the signal quality of the selected up-link speech frame signal 400 exceeds a reference value which is previously set in the base station control apparatus 100. Furthermore, the speech frame signal selecting unit 110 returns the quality results with respect to each of the frames in the plurality of received up-link speech frame signals 400 to the respective base stations as frame quality information.

The frame quality information supplied from the base station control apparatus 100 is entered to the power control bit producing unit 260-1 employed in the base station 200-1. The power control bit producing unit 260-1 adjusts the reference Eb/No based upon the inputted frame quality information. Also, the reception Eb/No equal to the output of the decoding unit 230-1 is entered into the power control bit producing unit 260-1. The power control bit producing unit 260-1 compares the reception Eb/No with the reference Eb/No so as to produce a power control bit. The produced power control bit is inserted into the speech data contained in the down-link speech frame signal, and then, the resultant speech data are transmitted as a down-link radio signal 21 from the transmission unit 220-1 to the mobile station 300.

In the mobile station 300, the down-link radio signal 21 is received by the reception unit 310, and then, is decoded by the decoding unit 330, so that a down-link speech frame signal 500 is reproduced. The reproduced down-link speech frame signal 500 is sent to the speech frame signal synthesizing unit 360. The speech frame signal synthesizing unit 360 extracts the power control bit which is inserted into the speech data 510 contained in the down-link speech frame signal 500, and then sends the extracted power control bit to the transmission power control unit 350. In this transmission power control unit 350, the up-link transmission power in the transmission unit 320 of the mobile station 300 is controlled in an optimum power value in accordance with the value of the sent power control bit.

Referring now to FIG. 3, FIG. 5, and FIG. 6, a description will be made of down-link transmission power control operations under normal operation. In FIG. 3, FIG. 5, and FIG. 6, the mobile station 300 receives the radio signal 21 transmitted from the base station 200-1 by the reception unit 310. The received radio signal is decoded by the decoding unit 330 to produce such a down-link speech frame signal 500 as shown in FIG. 5, which is supplied to the speech frame signal synthesizing unit 360. The down-link speech frame signal 500 is constituted by speech data 510 and speech data signal good/no-good information 520. In the speech frame signal synthesizing unit 360, the speech data signal good/no-good information 520 contained in this speech frame signal 500 is stored for a preselected time period, and then, such transmission power report information 630 as shown in FIG. 6 is produced. The transmission power report information 630 is constituted by an electric field strength 631, a measured frame number 632, and an error frame number 633. The transmission power report information 630 is synthesized with the speech data 610 to produce such an up-link speech control frame signal 600 as shown in FIG. 6. This up-link speech control frame signal 600 is transmitted as the up-link radio signal 20 from the transmission unit 320 to the base station 200-1.

The base station 200-1 receives the up-link radio signal 20 by the reception unit 210-1. The decoding unit 230-1 decodes the received radio signal 20 so as to reproduce an up-link speech control frame signal 600. The reproduced up-link speech control frame signal 600 is transmitted via the exclusively-used line 10 to the base station control apparatus 100.

The up-link speech control frame signal 600 transmitted to the base station control apparatus 100 is separated via the speech frame signal selecting unit 110 into both speech data 610 and transmission power report information 630. The speech data 610 are sent to the speech coding unit 120, and the transmission power report information 630 is sent to the control processing unit 130. The control processing unit 130 produces the reference Ec/Io from the measured frame number 632 and the error frame number 633, which are contained in the transmission power report information 630. In this case, the control processing unit 130 decreases the reference Ec/Io in the case that the error frame number 633 is smaller than, or equal to a predetermined threshold value. The control processing unit 130 maintains the reference Ec/Io in the case that the error frame number 633 is equal to such a predetermined threshold value. The control processing unit 130 increases the reference Ec/Io in such a case that the error frame number 633 is larger than, or equal to the predetermined threshold value.

Thereafter, the base station control apparatus 100 supplies via the exclusively-used line 11 both the electric field strength 631 contained in the transmission power report information 630, and also the reference Ec/Io produced in the control processing unit 130 to the transmission power control unit 250-1 of the base station 200-1. The transmission power control unit 250-1 controls the down-link transmission power in the transmission unit 220-1 of the base station 200-1 in an optimum manner in response to the value of the reference Ec/Io and the electric field strength 631. The above-explained operations correspond to the entire transmission power control operations of the mobile communication system under normal condition.

Figure 7:
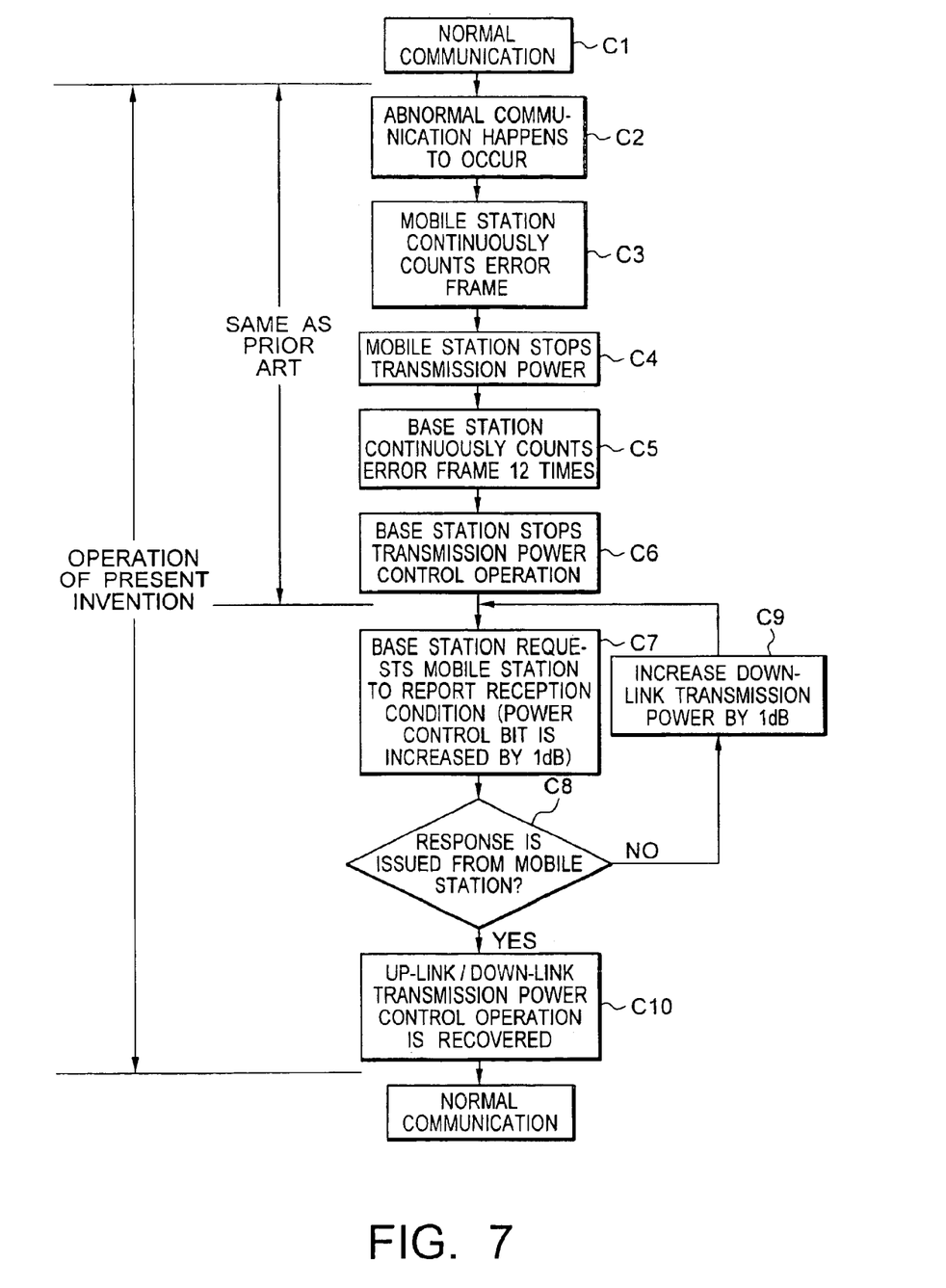
FIG. 7 is a flow chart for explaining operations of the mobile communication system according to the first embodiment of the present invention.

Subsequently, a description will now be made of operations of the transmission power control system, according to the first embodiment, in the case that an abnormal communication condition happens to occur due to the above-explained shadowing phenomenon in FIG. 1. FIG. 7 is a flow chart for explaining operations of the transmission power control system according to the first embodiment. In this flow chart, in the beginning, the communication is carried out under normal condition between the base station 200-1 and the mobile station 300 (step C1). When the mobile station 300 suddenly turns the crossing to the right direction and then enters into the shadow of building which may interrupt the radio channel as shown in FIG. 1, the present mobile communication system is brought into an abnormal communication condition (step C2). The mobile station 300 checks a received frame signal in order to judge as to whether or not this present condition corresponds to an instantaneous interrupt condition, namely a temporary phenomenon, and when the error frame is continuously counted 12 times, the mobile station 200 determines that this communication condition is the abnormal communication condition (step C3). The mobile station 300 which has determined the occurrence of the abnormal communication condition stops the transmission power of the transmission unit 320 (step C4). At the same time, the base station 200-1 also checks a received frame signal in order to judge as to whether or not this present condition corresponds to an instantaneous interrupt condition, namely a temporary phenomenon, and when the error frame is continuously counted 12 times, the mobile station 200-1 determines that this communication corresponds to the abnormal communication condition (step C5). The mobile station 200-1 which has determined the occurrence of the abnormal communication condition stops the transmission power control operation of the transmission unit 220-1 (step C6), and sets the transmission power at a constant level.

A series of the above-explained operations are identical to the conventional transmission power control operation defined in the IS-95 standard of TIA/EIA. The transmission power control system of this first embodiment is featured by adding the below-mentioned process operations to the above-explained transmission power control operations. That is to say, subsequently, in the base station, the down-link transmission power is increased in a constant interval until a response is issued from the mobile station, while the base station is released from the normal down-link transmission power control operation. Furthermore, while the power control bit produced by the base station is; controlled, the up-link transmission power of the mobile station is increased in a constant interval by this base station.

Referring back to the flow chart of FIG. 7, operations of this transmission power control system are continuously explained. Both the base station control apparatus 100 and the base station 200-1 request the mobile station 300 to report a reception condition of radio waves transmitted from the base station 200-1 (step C7), and wait for a response signal sent from the mobile station 300 (step C8). It should be noted a down-link power control bit is set to such a value which may increase the up-link transmission power of the mobile station by 1 step (1 dB). This down-link power control bit is inserted into the reception condition reporting request which is transmitted from the base station to the mobile station at this time.

In the case that the response signal sent from the mobile station 300 is not returned, the process operation is returned to such a process operation. That is, the down-link transmission power of the base station is increased by 1 dB (step C9), and then the base station control apparatus 100 and the base station 200-1 again request the mobile station 300 to report a reception condition of radio waves transmitted from the base station 200-1. Then, this process operation is repeatedly carried out. It should also be noted that the upper limit values used when the transmission power of the base station and also the transmission power of the mobile station are increased are selected to be constant design values which are determined by considering the setting conditions of the base stations of the entire system, the system capacity, the transmission power upper limit values of the apparatuses, and the like.

On the other hand, in such a case that the response signal sent from the mobile station 300 is returned at the step C8, such a condition can be established that both the up-link radio signal and the down-link radio signal can be transmitted/received under normal conditions. As a result, both the up-link normal transmission power control operation and the down-link normal transmission power control operation are recovered (step C10), so that the present abnormal communication is returned to the normal communication.

Figure 8:
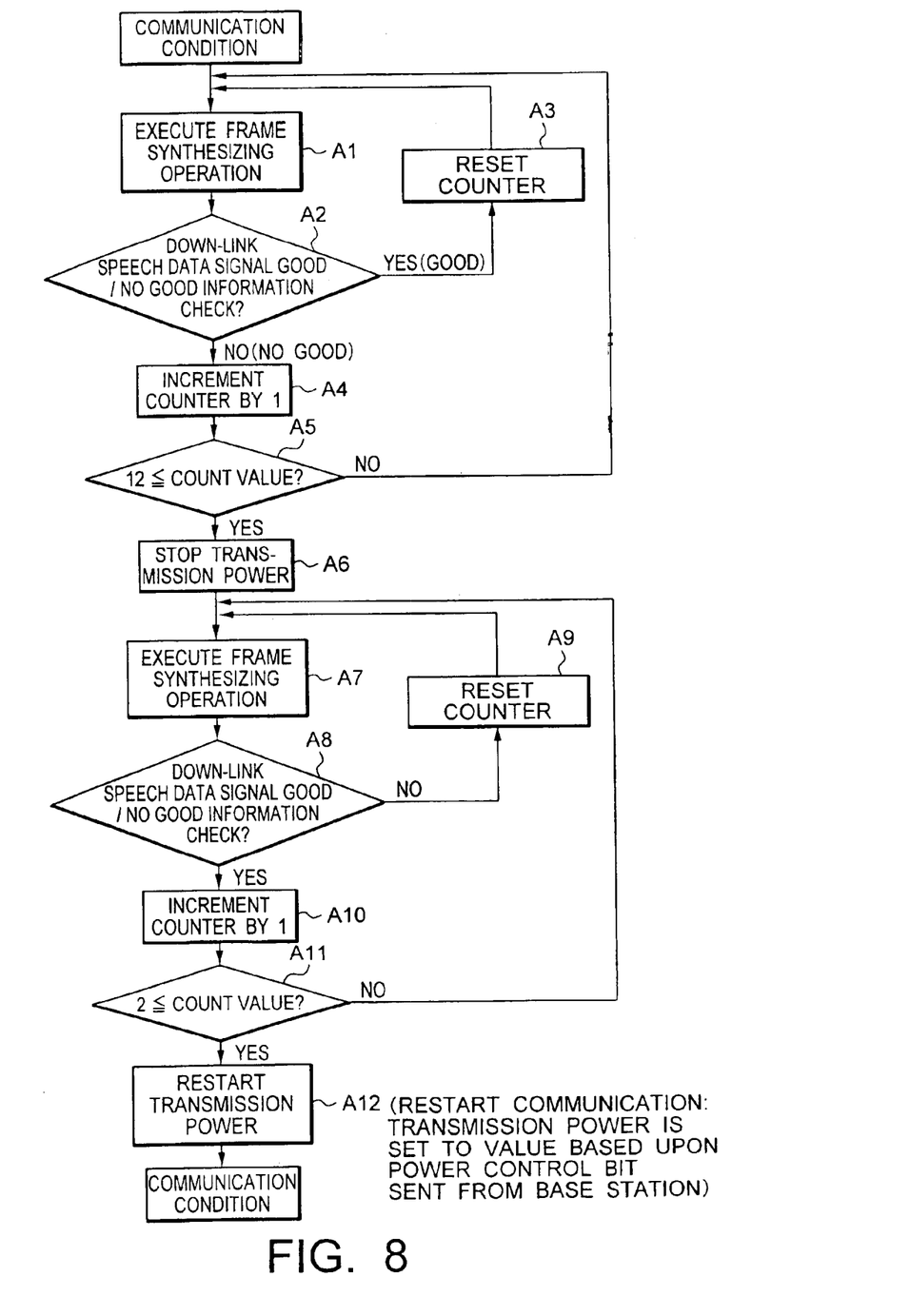
FIG. 8 is a flow chart for explaining operations executed on the side of the mobile station in the case that an abnormal communication condition happens to occur due to the shadowing phenomenon as explained in FIG. 1.

FIG. 8 is a flow chart for explaining operations executed on the side of the mobile station in such a case that the abnormal communication happens to occur due to the shadowing phenomenon as explained with reference to FIG. 1. In FIG. 8, a front half process operation of this flow chart corresponds to, as previously explained, such a process operation that when the mobile station 300 enters into the building shadow which may interrupt the radio channel, the mobile station checks as to whether or not this condition is an instantaneous condition equal to the temporary phenomenon. The mobile station 300 weights and synthesizes a down-link frame signal 500 by using the speech frame signal synthesizing unit 360 (step A1). The mobile station 300 checks speech data signal good/no-good information 520 contained in the down-link speech frame signal 500 in order to judge as to whether or not the down-link speech frame signal 500 is good (step A2).

As a result of this information check, when the down-link speech frame signal 500 is good (namely, no error), a check counter is reset, and then the process operation is returned to the frame synthesizing process operation (step A3). To the contrary, when the down-link speech frame signal 500 is not good (namely, error is contained), the check counter is counted up by 1 (step A4). Subsequently, the count value of the check counter is checked, and when this checked count value is smaller than 12, the process operation is returned to the frame synthesizing process operation (step A5). On the other hand, when this checked count value is larger than, or equal to 12, the transmission power of the mobile station 300 is stopped (step A6).

Next, a rear half process portion of this flow chart corresponds to such a process operation that the operation of the mobile station 300 is brought from the communication stop condition to the communication restart condition. While the transmission power of the mobile station 300 is maintained under stop condition, the down-link speech frame signal 500 is weighted and synthesized by the speech frame signal synthesizing unit 360 (step A7). The mobile station 300 checks as to whether or not the down-link speech frame signal 500 is good based upon the speech data signal good/no-good information 520 contained in the down-link speech frame signal 500 (step A8). As a result of this information check, when the down-link speech frame signal 500 is not good (namely, error is contained), the check counter is reset, and then the process operation is returned to the frame synthesizing process operation (step A9). To the contrary, when the down-link speech frame signal 500 is good (namely, no error), the check counter is counted up by 1 (step A10). Subsequently, the count value of the check counter is checked, and when this checked count value is smaller than 2, the process operation is returned to the frame synthesizing process operation (step A11). On the other hand, when this checked count value is larger than, or equal to 2, the transmission power of the mobile station 300 is restarted (step A12), so that the mobile station 300 is brought into the communication condition. It should also be noted that the transmission power value corresponds to such a value which is produced based upon the power control bit transmitted from the base station.

Figure 9:
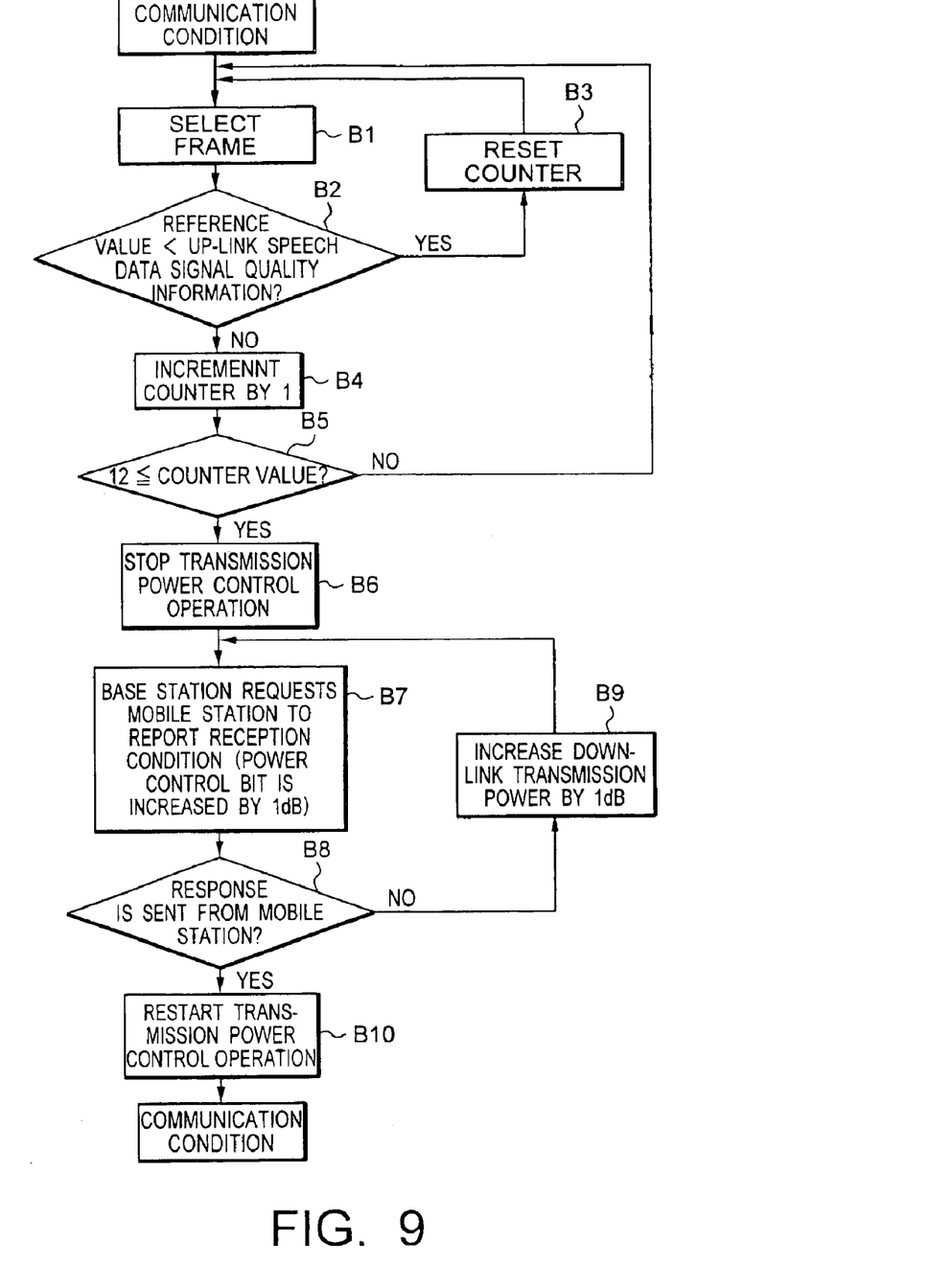
FIG. 9 is a flow chart for describing operations of the base station control apparatus and the base station employed in the mobile communication system in the case that the abnormal communication condition happens to occur due to the shadowing phenomenon as explained in FIG. 1.

FIG. 9 is a flow chart for representing operations of both the base station control apparatus 100 and the base station in such a case that the abnormal communication happens to occur due to the shadowing as explained in FIG. 1. In FIG. 9, a front half process portion of this flow chart corresponds to, as explained above, such a process operation that when the mobile station 300 enters into the shadow of building which may interrupt the radio channel, the base station control apparatus 100 and the base station checks as to whether or not this condition is an instantaneous condition equal to the temporary phenomenon. In the base station control apparatus 100, the up-link speech frame signal 400 is selected by the speech frame signal selecting unit 110 (step B1). The base station control apparatus 100 compares the speech data signal quality information 420 contained in the speech frame signal 400 with a previously set reference value (step B2). As a result of this comparison, in the case that the speech data signal quality information 420 exceeds the reference value, the check counter is reset, and then, the process operation is returned to the frame selection process operation (step B5). On the other hand, when the speech data signal quality information 420 is smaller than, or equal to the reference value, the check counter is counted up by 1 (step B4). Subsequently, the count value of the check counter is checked, and when this checked count value is smaller than 12, the process operation is returned to the frame selection process operation (step B5). On the other hand, when this checked count value is larger than, or equal to 12, the transmission power of the base station 200-1 is stopped by the base station control apparatus 100 (step B6).

Next, a rear half process portion of this flow chart corresponds to such a process operation that the operation of the mobile station 200-1 is brought from the transmission power control operation stop condition to the transmission power control operation restart condition. The base station control apparatus 100 requests the mobile station 300 via the mobile station 200-1 to report a reception condition of radio waves transmitted from the base station 200-1 (step 37), and wait for a response signal sent from the mobile station 300 (step B8). It should be noted a down-link power control bit is set to such a value which may increase the up-link transmission power of the mobile station 300 by 1 step (1 dB). This down-link power control bit is inserted into the reception condition report request which is transmitted from the base station to the mobile station 300 at this time.

In the case that the response signal sent from the mobile station 300 is not returned, the process operation is returned to such a process operation. That is, the down-link transmission power of the base station is increased by 1 dB by the base station control apparatus 100 (step B9), and then the base station control apparatus 100 again requests the mobile station 300 to report a reception condition of radio waves transmitted from the base station 200-1. Then, this process operation is repeatedly carried out.

On the other hand, in such a case that the response signal sent from the mobile station 300 is returned at the step B8, such a condition can be established that both the up-link radio signal and the down-link radio signal can be transmitted/received under normal conditions. As a result, the down-link normal transmission power control operation is restarted (step B10), and therefore, the mobile communication system is brought into the communication condition.

As previously explained in detail, in accordance with the first embodiment, the down-link transmission power is successively increased in a constant interval by 1 dB by the base station until the response is issued from the mobile station, and while the power control bit produced by the base station is controlled, this base station successively increases the up-link transmission power of the mobile station in a constant interval by 1 dB.

Figure 10:
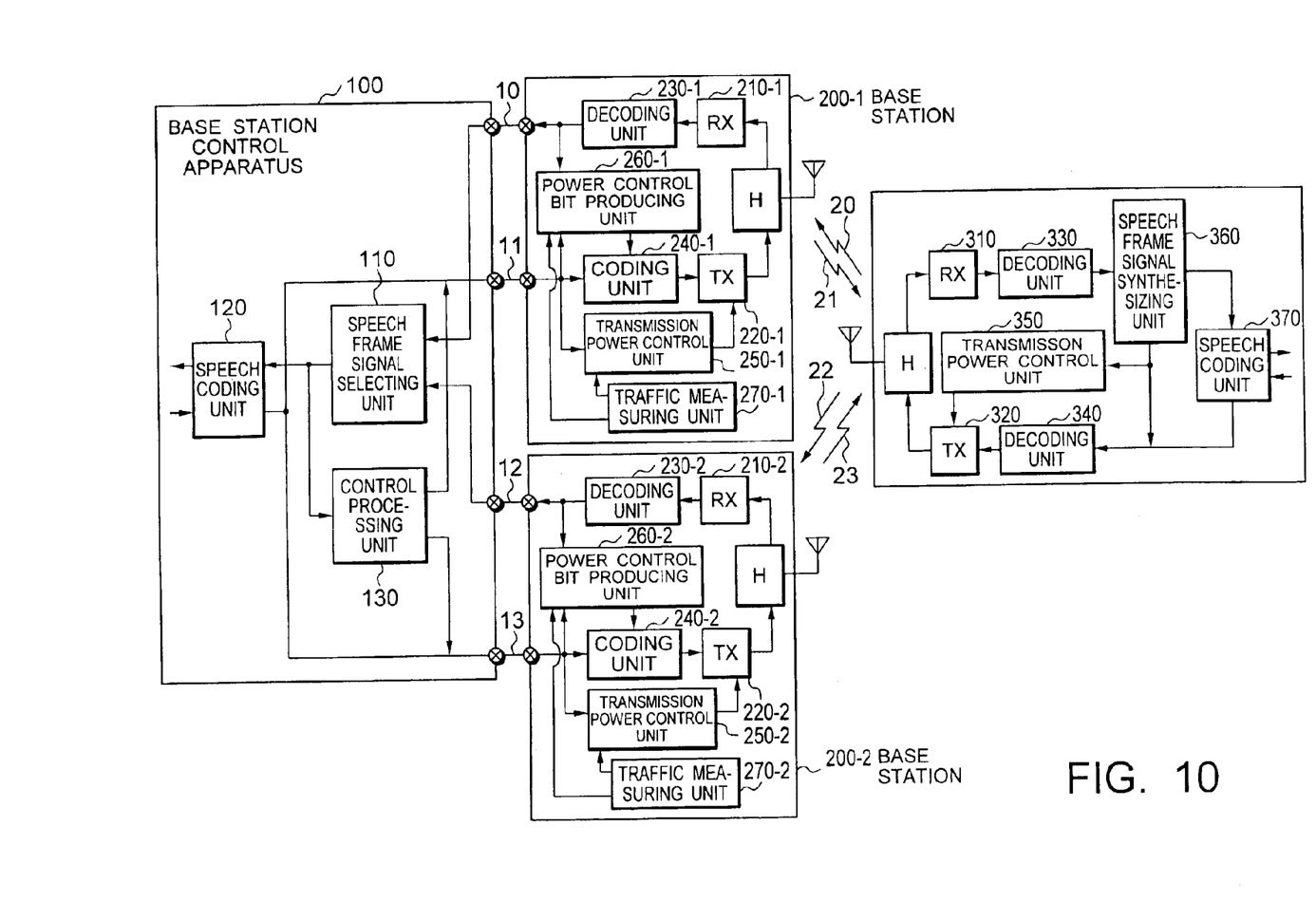
FIG. 10 is a schematic block diagram for indicating arrangements of a base station control apparatus, a base station, and a mobile station employed in a mobile communication system according to a second embodiment of the present invention.

Referring now to FIG. 10, a transmission power control system according to a second embodiment of the present invention will be described. FIG. 10 is a schematic block diagram for indicating internal arrangements of a base station control apparatus 100, a base station 200-1, a base station 200-2, and a mobile station 300. In FIG. 10, the transmission power control system of this second embodiment owns such a feature that a traffic measuring unit 270-1 and a traffic measuring unit 270-2 are added to the base station 200-1 and the base station 200-2, respectively.

The traffic measuring unit 270-1 of the base station 200-1 investigates a traffic condition of the base station 200-1, and then, supplies a traffic value of the investigated base station to both the transmission power control unit 250-1 and the power control bit producing unit 260-1. Similar to this traffic measuring unit 270-1, the traffic measuring unit 270-2 of the base station 200-2 investigates a traffic condition of the base station 200-2, and then, supplies a traffic value of the investigated base station to both the transmission power control unit 250-2 and the power control bit producing unit 260-2.

As an example of a concrete item indicative of a traffic amount of a base station, a use rate of a radio appliance board installed in the base station is employed. The reason why such a use rate of the radio appliance board is employed is given as follow. That is, this numeral value is to couple to a call passing through this base station, and may be simply obtained in the case that the base station solely measures the traffic amount. Then, since other arrangements than the above-explained arrangements are identical to those of the first embodiment, the same reference numerals are applied thereto, and descriptions thereof are omitted.

Figure 11:
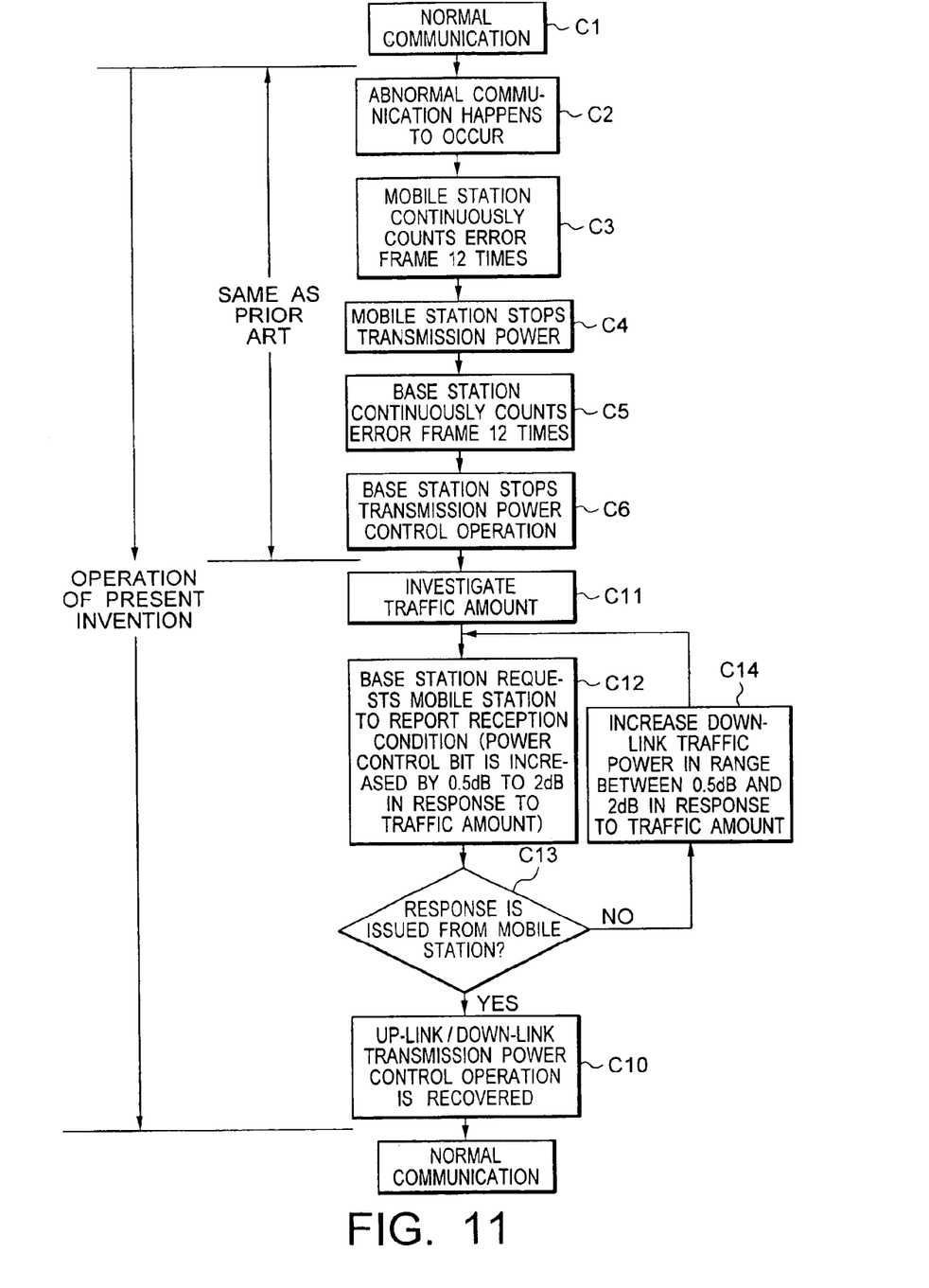
FIG. 11 is a flow chart for describing operations of the mobile communication system according to the second embodiment of the present invention.

Subsequently, a description will now be made of operations of the transmission power control system according to the second embodiment in the case that the abnormal communication happens to occur due to the shadowing as explained in FIG. 1. FIG. 11 is a flow chart for explaining operations of the transmission power control system according to the second embodiment of the present invention. Since process operations defined from a step C1 to a step C6 shown in FIG. 11 are identical to those of the first embodiment as explained in FIG. 7, the same reference numerals are applied thereto, and the explanations thereof are omitted.

A process operation of this flow chart will now be explained from a step C11. At this step C11, the base station 200-1 investigates a use rate of a radio appliance board installed in the own base state 200-1 as a traffic amount of the own base station. Next, both the base station control apparatus 100 and the base station 200-1 request the mobile station 300 to report a reception condition of radio waves transmitted from the base station 200-1. In this case, the base station 200-1 sets a down-link power control bit to such a value that the down-link transmission power of the base station is increased within a range between 0.5 dB and 2 dB in response to the use rate of the radio appliance board (step C12). Both the base station control apparatus 100 and the base station 200-1 wait for a response signal transmitted from the base station 300 (step C13). In the case that the response signal is not returned from the mobile station 300, the down-link transmission power of the base station is increased within the range defined from 0.5 dB up to 2 dB in response to the use rate of the radio appliance board (step C14). Then, the process operation is returned to such a process operation that both the base station control apparatus 100 and the base station 200-1 again request the mobile station 300 to report a reception condition of radio waves transmitted from the base station 200-1, and then, this process operation is repeatedly carried out.

This is because when the use rate of the radio appliance board of the base station is high and the traffic amount is large, there is no margin as to the interference amount given to other mobile stations, such a correct transmission power control operation is required. As a consequence, the increasing step by the small stepped 0.5 dB is set. Then, in the case that the use rate of the radio appliance board of the base station is low and the traffic amount is small, since there is margin as to the interference amount given to other mobile stations, even when the transmission power becomes more or less high, there is a small problem and the increasing speed of the transmission power may constitute the major factor. As a result, the increasing step by 2 dB is set.

To the contrary, in the case that the response signal transmitted from the mobile station 300 is returned at the step C13, both the up-link radio signal and the down-link radio signal can be transmitted/received under normal condition, and also both the up-link/down-link normal transmission power control operations are recovered (step C10), so that the abnormal communication can be returned to the normal communication.

Figure 12:
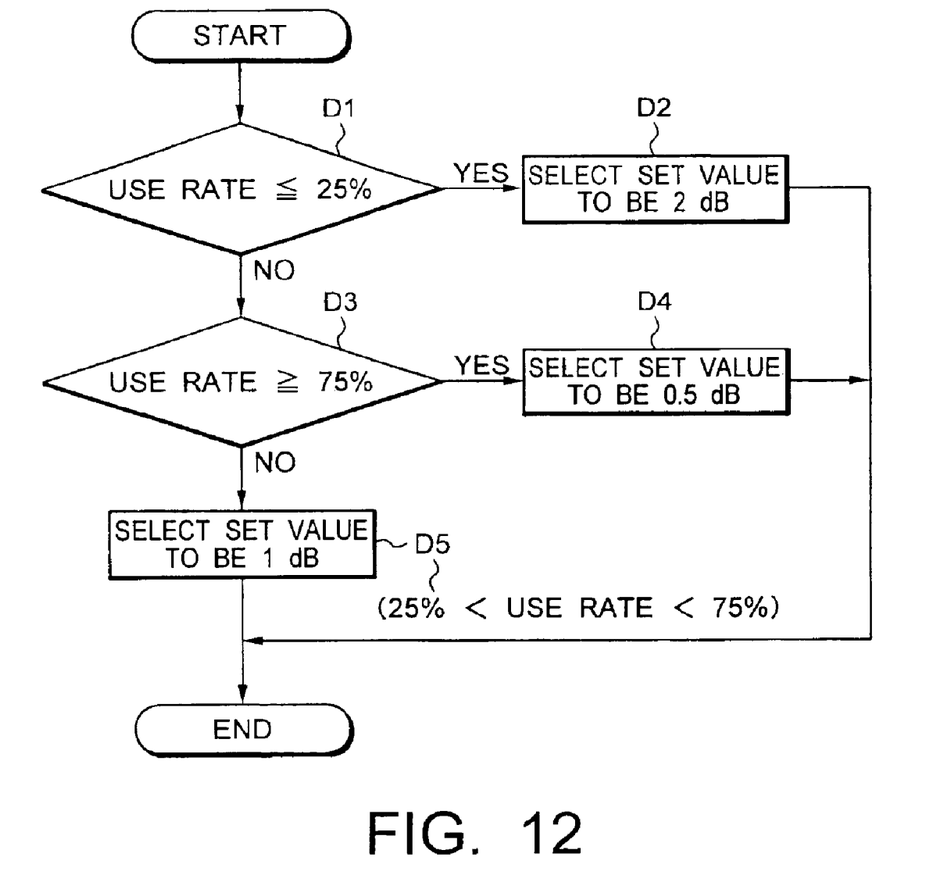
FIG. 12 is an example of a flow chart for describing a relationship between a use rate of a radio appliance board and a transmission power control step value set in the flow chart of FIG. 1.

FIG. 12 is an example of a flow chart for representing relationship between the use rate of the radio appliance board and the set step value of the transmission power control, which are described at the steps C12 and C14 in FIG. 11. In FIG. 12, in the case that the use rate of the radio appliance board of the base station is smaller than, or equal to 25% (step D1), the transmission power control step value is selected to be 2 dB (step D2). This transmission power control step value is set to both the transmission power control unit of the base station and the power control bit producing unit. Also, in the case that the use rate of the radio appliance board of the base station is larger than, or equal to 75% (step D3), the transmission power control step value is selected to be 0.5 dB (step D4). This transmission power control step value is set to both the transmission power control unit of the base station and the power control bit producing unit. Also, in the case that the use rate of the radio appliance board of the base station exceeds 25%, and is smaller than 75%, the transmission power control step value is selected to be 1 dB (step D5). This transmission power control step value is set to both the transmission power control unit of the base station and the power control bit producing unit. The above-explained setting descriptions indicate the relations between the concrete use rates of the radio appliance board and the set concrete step values of the transmission power control.

As previously explained, in accordance with the transmission power control systems of the second embodiment, the down-link transmission power is increased in a constant interval within the range between 0.5 dB and 2 dB in response to the traffic amount of the base station. Furthermore, while the power control bit produced by the base station is controlled, the up-link transmission power of the mobile station is increased in a constant interval within such a range between 0.5 dB and 2 dB in response to the traffic amount of the base station.

As apparent from the above-explained descriptions, in accordance with the transmission power control system of the present invention, in such a case that the mobile station which is communicated with the base station under normal condition is moved to such a place where the radio wave interruption (namely shadowing phenomenon) happens to occur due to the constructive article such as buildings and then both the radio channels are interrupted along both the up-link direction and the down-link direction, the base station successively increases the down-link transmission power in a constant interval by 1 dB until the response signal is sent from the mobile station, while releasing the normal down-link transmission power control operation. Furthermore, the base station controls the power control bit produced in the base station so as to successively increase the up-link transmission power of the mobile station in a constant interval by 1 dB. As a consequence, the communication established between the base station and the mobile station can be recovered.

In addition, in accordance with the transmission power control system of the present invention, in such a case that the mobile station which is communicated with the base station under normal condition is removed to such a place where the radio wave interruption (namely shadowing phenomenon) happens to occur due to the constructive article such as buildings and then both the radio channels are interrupted along both the up-link direction and the down-link direction, the base station increases the down-link transmission power in a constant interval in the range between 0.5 dB and 2 dB in response to the traffic amount of the base station until the response signal is sent from the mobile station, while releasing the normal down-link transmission power control operation. Furthermore, the base station controls the power control bit produced in the base station so as to increase the up-link transmission power of the mobile station in a constant interval within the range between 0.5 dB and 2 dB in response to the traffic amount of the base station. As a result, the communication established between the base station and the mobile station can be quickly recovered, while suppressing the interference given to other mobile stations.

What is claimed is:

1. A mobile communication system comprising:
   a mobile station;
   a plurality of base stations; and
   a base station control apparatus,
   wherein when a selected base station of the plurality of base stations detects an interruption of communication between the selected base station and the mobile station, the selected base station iteratively executes a series of steps until the selected base station receives a response from the mobile station, the series of steps comprising:
      issuing a request that commands the mobile station to transmit the response;
      controlling a power control bit contained in the request to increase a transmit power of the mobile station by a first step size;
      if the selected base station does not receive the response, increasing a transmit power of the selected base station by a second step size and again executing the series of steps; and
      if the selected base station does receive the response, terminating the iterative execution of the series of steps; and
   wherein the first and the second step sizes are set to a value between 0.5 dB and 2 dB in response to a traffic amount measured by traffic measuring means of the selected base station.

2. A mobile communication system comprising:
   a mobile station;
   a plurality of base stations; and
   a base station control apparatus;
   wherein when a selected base station of the plurality of base stations detects an interruption of communication between the selected base station and the mobile station, the selected base station iteratively executes a series of steps until the selected base station receives a response from the mobile station, the series of steps comprising:
      issuing a request that commands the mobile station to transmit the response;
      controlling a power control bit contained in the request to increase a transmit power of the mobile station by a first step size;
      if the selected base station does not receive the response, increasing a transmit power of the selected base station by a second step size and again executing the series of steps; and
      if the selected base station does receive the response, terminating the iterative execution of the series of steps; and
   wherein the first and the second step sizes are set to a value between 0.5 dB and 2 dB in response to a use rate of a radio appliance board of the selected base station.

3. The mobile communication system in accordance with claim 2 wherein:
   when the use rate of the radio appliance board of said selected base station is smaller than, or equal to 25%, said first and said second step sizes are set to 2 dB;
   when the use rate of the radio appliance board of said selected base station is larger than, or equal to 75%, said first and said second step sizes are set to 0.5 dB; and
   when the use rate of the radio appliance board of said selected base station exceeds 25% and is smaller than 75%, said first and said second step sizes are set to 1 dB.

4. A method of operation in a base station of a mobile communication system, the method comprising:
   detecting an interruption of communication between the base station and a mobile station; and
   iteratively executing a series of steps until the base station receives a response from the mobile station, the series of steps comprising:
      issuing a request that commands the mobile station to transmit the response, the request including a command to increase a transmit power of the mobile station;
      if the base station does not receive the response, increasing a transmit power of the base station and again executing the series of steps; and
      if the base station does receive the response, terminating the iterative execution of the series of steps.

5. The method in accordance with claim 4, wherein the transmit power of the mobile station is commanded to be increased by and the transmit power of the base station is increased by steps of 1 dB.

6. The method in accordance with claim 4, wherein the transmit power of the mobile station is commanded to be increased by and the transmit power of the base station is increased in steps of a size ranging from 0.5 dB to 2 dB in response to a traffic amount measured by a traffic measuring means of the base station.

7. The method in accordance with claim 4, wherein the transmit power of the mobile station is commanded to be increased by and the transmit power of the base station is increased in steps of a size ranging from 0.5 dB to 2 dB in response to a use rate of radio appliance board of the base station.

8. The method in accordance with claim 7, wherein:
   when the use rate of the radio appliance board of the base station is smaller than or equal to 25%, the transmit power of the mobile station is commanded to be increased by and the transmit power of the base station is increased by 2 dB;

when the use rate of the radio appliance board of the base station is larger than or equal to 75%, the transmit power of the mobile station is commanded to be increased by and the transmit power of the base station is increased by 0.5 dB; and when the use rate of the radio appliance board of the base station exceeds 25% and is smaller than 75%, the transmit power of the mobile station is commanded to be increased by and the transmit power of the base station is increased by 1 dB.

9. A mobile communication system comprising:

a mobile station;

a plurality of base stations; and a base station control apparatus;

wherein when a selected base station of the plurality of base stations detects an interruption of communication between the selected base station and the mobile station, the selected base station iteratively executes a series of steps until the selected base station receives a response from the mobile station, the series of steps comprising:

issuing a request that commands the mobile station to transmit the response, the request including a command to increase a transmit power of the mobile station;

if the selected base station does not receive the response, increasing a transmit power of the selected base station and again executing the series of steps; and if the selected base station does receive the response, terminating the iterative execution of the series of steps.

10. The mobile communication system in accordance with claim 9 wherein the transmit power of the mobile station is commanded to be increased by and the transmit power of the base station is increased in steps of 1 dB.

* * * * *